US012252337B2

(12) United States Patent
Martin, II et al.

(10) Patent No.: US 12,252,337 B2
(45) **Date of Patent: *Mar. 18, 2025**

(54) LOCKING DEVICE FOR WASTE CONTAINER AND METHODS

(71) Applicant: SERIO—US INDUSTRIES, INC., Baltimore, MD (US)

(72) Inventors: James L. Martin, II, Gambrills, MD (US); David L. Reeb, Sykesville, MD (US)

(73) Assignee: Serio-Us Industries, Inc., Baltimore, MD (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/242,402

(22) Filed: Sep. 5, 2023

(65) Prior Publication Data

US 2023/0406617 A1 Dec. 21, 2023

Related U.S. Application Data

(63) Continuation of application No. 17/189,609, filed on Mar. 2, 2021, now Pat. No. 11,745,942.

(Continued)

(51) Int. Cl.
*B65F 1/16* (2006.01)
*E05C 3/12* (2006.01)

(52) U.S. Cl.
CPC .............. *B65F 1/1615* (2013.01); *E05C 3/12* (2013.01); *E05C 2003/128* (2013.01); *E05Y 2201/46* (2013.01)

(58) Field of Classification Search
CPC ................... B65D 55/14; B65F 1/1615; B65F 2001/1669; E05C 3/12; E05C 2003/128;

(Continued)

(56) References Cited

U.S. PATENT DOCUMENTS

| | | | |
|---|---|---|---|
| 9,981,802 B2 | 5/2018 | Reeb et al. | |
| 11,745,942 B2 * | 9/2023 | Martin, II | E05B 15/0073 220/833 |
| 2016/0159570 A1 | 6/2016 | Reeb et al. | |

FOREIGN PATENT DOCUMENTS

| | | |
|---|---|---|
| GB | 2446014 A | 7/2008 |
| WO | WO2007142595 A1 | 12/2007 |

(Continued)

OTHER PUBLICATIONS

International Search Report and Written Opinion mailed Jun. 23, 2021 from corresponding application PCT/US2021/020395 in the name of Serio—US Industries, Inc.

*Primary Examiner* — Don M Anderson
*Assistant Examiner* — Elizabeth J Volz
(74) *Attorney, Agent, or Firm* — CALDERON SAFRAN & WRIGHT P.C.

(57) ABSTRACT

The present invention provides a locking device for a waste container that keeps the lid of the container closed when the container is knocked over on its side, as may arise from a sudden jerking or jarring motion, such as by impact with the ground, to prevent spillage of its contents. The locking device allows the lid to open automatically when the waste container is tipped over by a dumping operation. The locking device includes a sliding block slidable between a locked position and an open position, and a pendulum weight detachably attached to a magnet, when detached from the magnet, the pendulum weight blocks the sliding block from sliding to the open position. When attached to the magnet, the pendulum weight allows the sliding block to slide to the open position.

20 Claims, 13 Drawing Sheets

Related U.S. Application Data

(60) Provisional application No. 62/984,164, filed on Mar. 2, 2020.

(58) Field of Classification Search
CPC ............ E05Y 2201/46; E05B 65/5292; E05B 65/006; E05B 2047/0075; E05B 2047/0078; E05B 15/0093
USPC ........ 220/833, 835, 315, 324; 292/130, 183, 292/230
See application file for complete search history.

(56) References Cited

FOREIGN PATENT DOCUMENTS

| | | | | |
|---|---|---|---|---|
| WO | WO2017193124 | * | 11/2017 | ......... E05B 17/2007 |
| WO | WO2017193124 A1 | | 11/2017 | |

* cited by examiner

LOCKING DEVICE FOR WASTE CONTAINER AND METHODS

CROSS-REFERENCE TO RELATED APPLICATIONS AND CLAIM TO PRIORITY

This application is a continuation of U.S. patent application Ser. No. 17/189,609, filed Mar. 2, 2021, now U.S. Pat. No. 11,745,942, which is related to provisional application No. 62/984,164, filed Mar. 2, 2020, in the United States of America, the disclosures of which are incorporated herein by reference and to which priority is claimed.

FIELD OF THE INVENTION

The present invention generally relates to locking devices for waste containers and methods of use of the locking devices, particularly residential or commercial waste containers. In particular, the invention relates to a waste container locking device and methods of use which keeps the container closed when a sudden jerk or jarring, such as caused by ground impact, is applied to the container, but allows the lid to open automatically when the waste container is tipped over by a dumping operation.

BACKGROUND

As is well known, residential or commercial waste containers, for use in residential or commercial applications, typically include a base structure covered by a pivotable lid. These containers usually contain a block-shaped container with a hinged lid attached to one side thereof. The containers may be emptied by an automated lifting device on certain waste removal vehicles, which tilts the waste containers for emptying the contents of the waste containers. The containers are generally lifted by the lifting mechanism and pivoted in some fashion, so that the hinged top of the container opens and the trash contained therein is emptied into the vehicle. The container is then returned to a position on the ground, and the hinged lid closes due to gravity on the top of the container.

The waste containers may be available for purchase by homeowners from various home improvement, big box retailers or department stores. When the container is in an upright position, the lid is closed and prevents animals from accessing the waste within the container. However, when the container is tipped over on its side, e.g., by animals or by strong wind, the lid may open, spilling the contents of the container or allowing animals to access the interior of the container.

Locks may be provided to prevent the lid from opening when the waste container is knocked over on its side or to prevent unwanted access to the container. However, these locks may prevent the automated lifting device on the trash removal vehicle from being able to empty the container, or require the operator to manually unlock the waste container before placing it on the automated lifting device.

Therefore, there remains a need for a locking device that prevents the unintended opening of the waste container, such as by an accidental knockdown, but does not require manual unlocking when being tilted over, e.g., by a lifting mechanism.

SUMMARY OF THE INVENTION

The present invention provides a locking device for a waste container that keeps the lid of the container closed when the container is knocked over on its side, as may arise from a sudden jerking or jarring motion, such as by impact with the ground, to prevent spillage of its contents. The locking device allows the lid to open automatically when the waste container is tipped over by a dumping operation. Preferably, the locking device also provides for smooth operation of the lid, even when the waste container is inverted and the lid is heavily weighed by the contents of the container.

Another aspect of the present invention provides a waste container having the locking device mounted thereon, preferably in the lid of the container. The lid contains a cutout through which the locking device is mounted.

Methods for making and using the different aspects of the present invention are also provided.

Other aspects of the invention, including apparatus, devices, kits, processes, and the like which constitute part of the invention, will become more apparent upon reading the following detailed description of the exemplary embodiments.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

(FIGS. 4-8 show different perspective views of the locking device from different locations to better illustrate the components and interconnection of the components of the locking device);

DETAILED DESCRIPTION OF THE PREFERRED EMBODIMENT(S)

Figure 1:
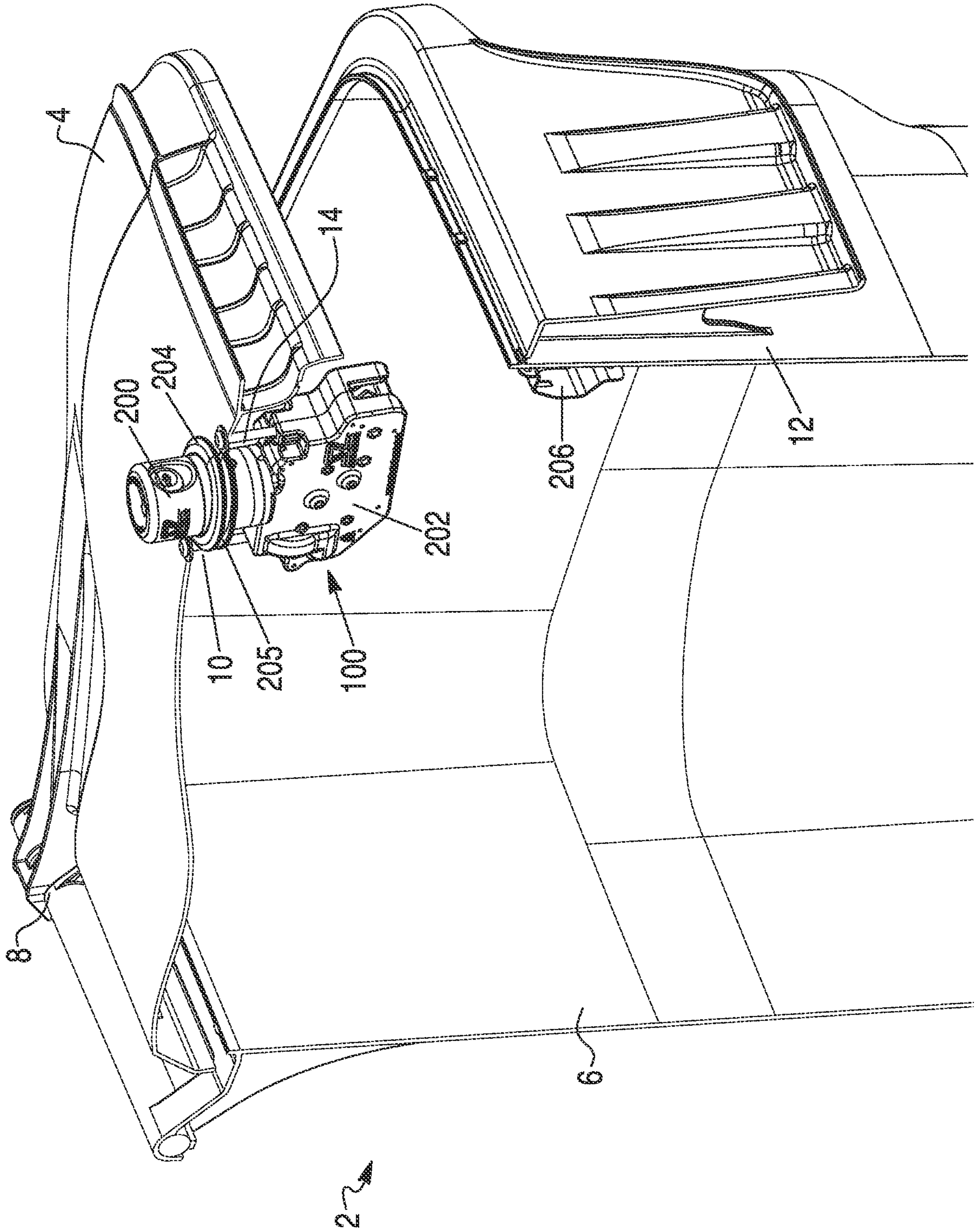
FIG. 1 shows a fragmentary cut-away view of a waste container having the locking device of the present invention mounted thereon.

The exemplary embodiment(s) of the present invention will now be described with the reference to accompanying drawings. The following description of the preferred embodiment(s) is merely exemplary in nature and is in no way intended to limit the invention, its application, or uses.

For purposes of the following description, certain terminology is used in the following description for convenience only and is not limiting. The characterizations of various components and orientations described herein as being "front," "back," "vertical," "horizontal," "upright," "right," "left," "side," "top," "bottom," or the like designate directions in the drawings to which reference is made and are relative characterizations only based upon the particular position or orientation of a given component as illustrated. These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof and words of similar import.

FIG. 1 illustrates a waste container 2, such as a trash container typically used by homeowners or businesses to deposit, retain, and store trash awaiting pick-up by a trash removal vehicle. The container 2 may be tilted or otherwise pivoted from an upright storage position (as shown in FIG. 1) to a tilted or dumping position to empty its contents.

The container 2 has at least one lid 4 on top of a main box 6. Box 6 defines an interior volume for holding waste. The lid 4 is mounted on a lid hinge 8, typically at the rear, of the container 2 so that when an upward force is applied to the lid 4, it opens by pivoting on the lid hinge 8 (FIG. 1 shows the lid 4 slightly opened). A locking device 100 is mounted in a cutout 10 in the lid 4. In an exemplary embodiment, the locking device 100 is mounted so that a part of the locking device 100 protrudes above the lid 4 and thus outside of container 2, as best illustrated in FIG. 1. The locking device 100 is preferably positioned towards the front of the lid 4 for reasons to be apparent below.

Figure 2:
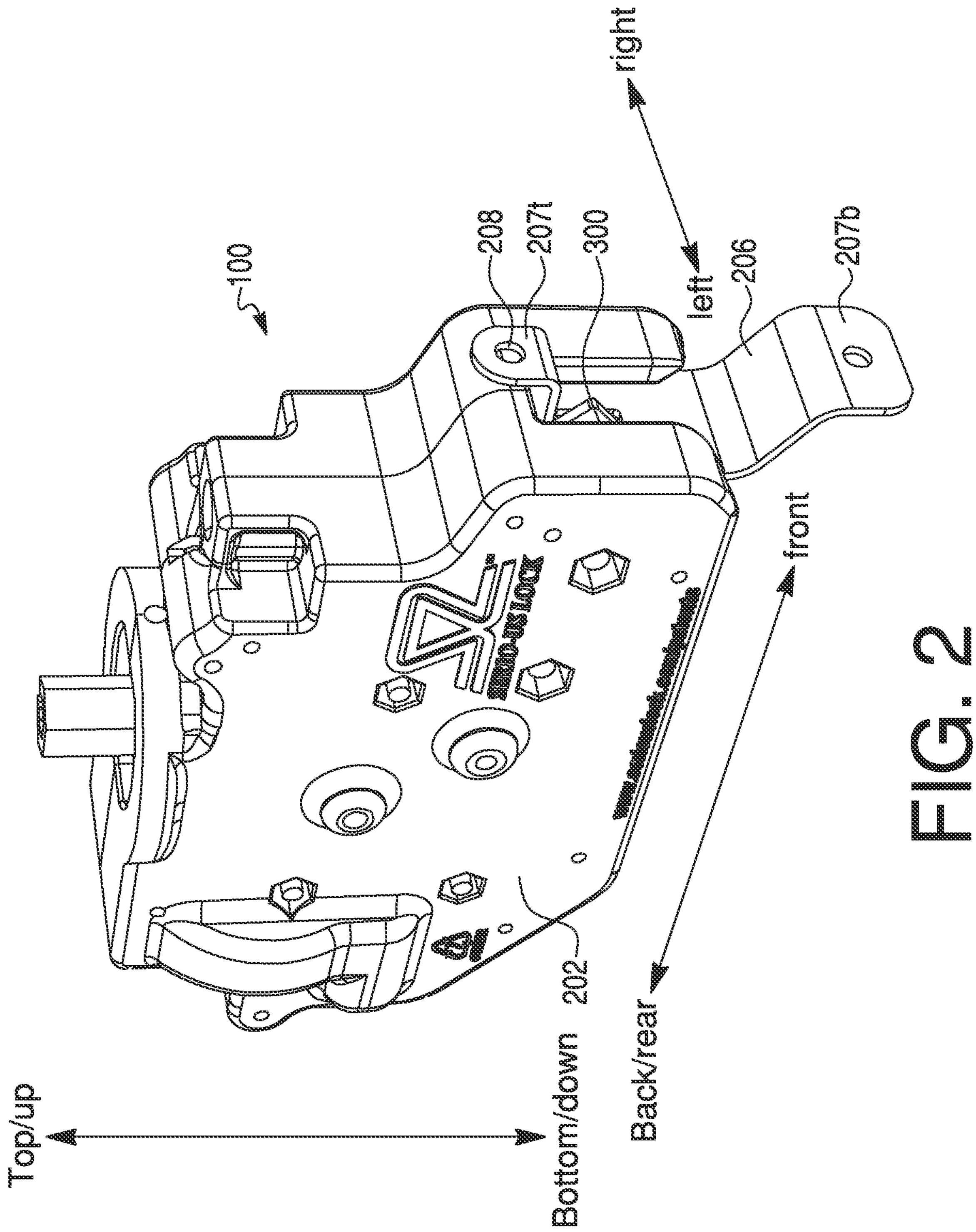
FIG. 2 shows a perspective view of the locking device, including its bottom cover.

Referring to FIGS. 1-2, the locking device 100 contains a housing 200 including a bottom cover 202 extending below the lid 4. The bottom cover 202 may be made of two halves that are attached together by mechanical fasteners, e.g., screws, to protect its contents.

In an exemplary embodiment, as best shown in FIG. 1, the housing 200, a top portion of which is exposed outside of the waste container 2, may be retained in the cutout 10 of the lid 4 by a collar 204. The collar 204 may be a ring, preferably made of an elastomer, such as rubber or similarly elastic polymers, having a channel 205 around its outer circumference (see FIG. 1). The cutout 10 in the lid 4 fits into the channel 205; and the collar 204 provides a weatherproof seal for the housing 200. The housing is attached to the lid 4 by one or more mounting fasteners 14. Because the lid 4 is not always perfectly horizontal to the ground when the container 2 is upright, the mounting fasteners 14 may be adjusted so that the locking device 100 is parallel with the top of container 2.

A locking member 206, as best shown in FIG. 2, protrudes through an opening at the bottom of the bottom cover 202. The locking member 206 preferably has flat portions **207*b* and 207*t* that are fastened to a wall 12, preferably the front wall, of the main box 6, e.g., by screws or nuts/bolts, through at least one hole 208 (best shown in FIGS. 2-3). When installed on the wall 12 of the waste container 2, the flat portion 207*b* of the locking member 206 lays flat against the surface of the wall 12. At a top end closest to the lid 4, the locking member 206 contains a locking hole 302 (best shown in FIGS. 3-4) that is configured to allow a latch 300 to protrude therethrough. Although the drawings illustrate the latch 300 protruding through the locking hole 302 to lock the lid 4, one skilled in the art would appreciate that other locking mechanisms on the locking member 206 may be used to interlock with the latch 300** to produce similar results.

Figure 4:
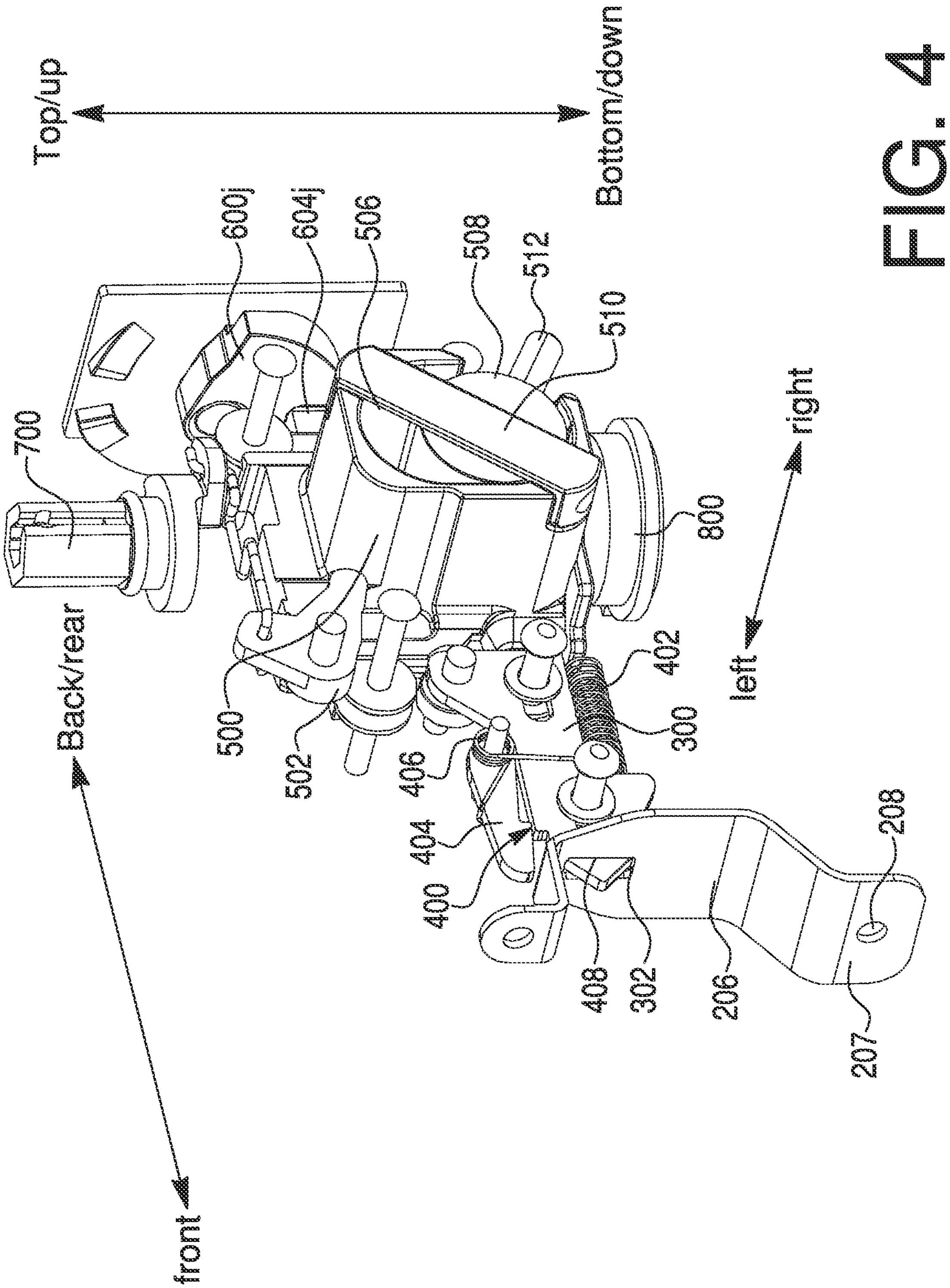
FIG. 4 shows a second perspective view of the locking device (without the bottom cover)

The locking device 100 is preferably contained inside the bottom cover 202 and contains a latching mechanism 400, a sliding block 500, and one or more pendulum weights 600. The latch 300 is part of the latching mechanism 400 contained in the bottom cover 202. When a front end 408 of the latch 300 protrudes through the locking hole 302 when the lid 4 is in the closed position, the lid 4 is locked to the main box 6. When the waste container 2 is in its upright position and the lid 4 is closed, the latch 300 extends from the locking hole 302 to lock the lid 4 in place. The latch 300 is preferably biased backwardly, e.g., by a spring 402, in a direction for disengagement from the locking hole 302. As best shown in FIG. 4, the latch assembly 400 also contains a deflecting arm 404 which is biased against the latch 300, preferably by a torsion spring 406. The function of the deflecting arm 404 is described below. The latch 300 also contains a rear 410 opposing the front end 408. The rear 410 of the latch 300 abuts the sliding block 500.

Figure 3:
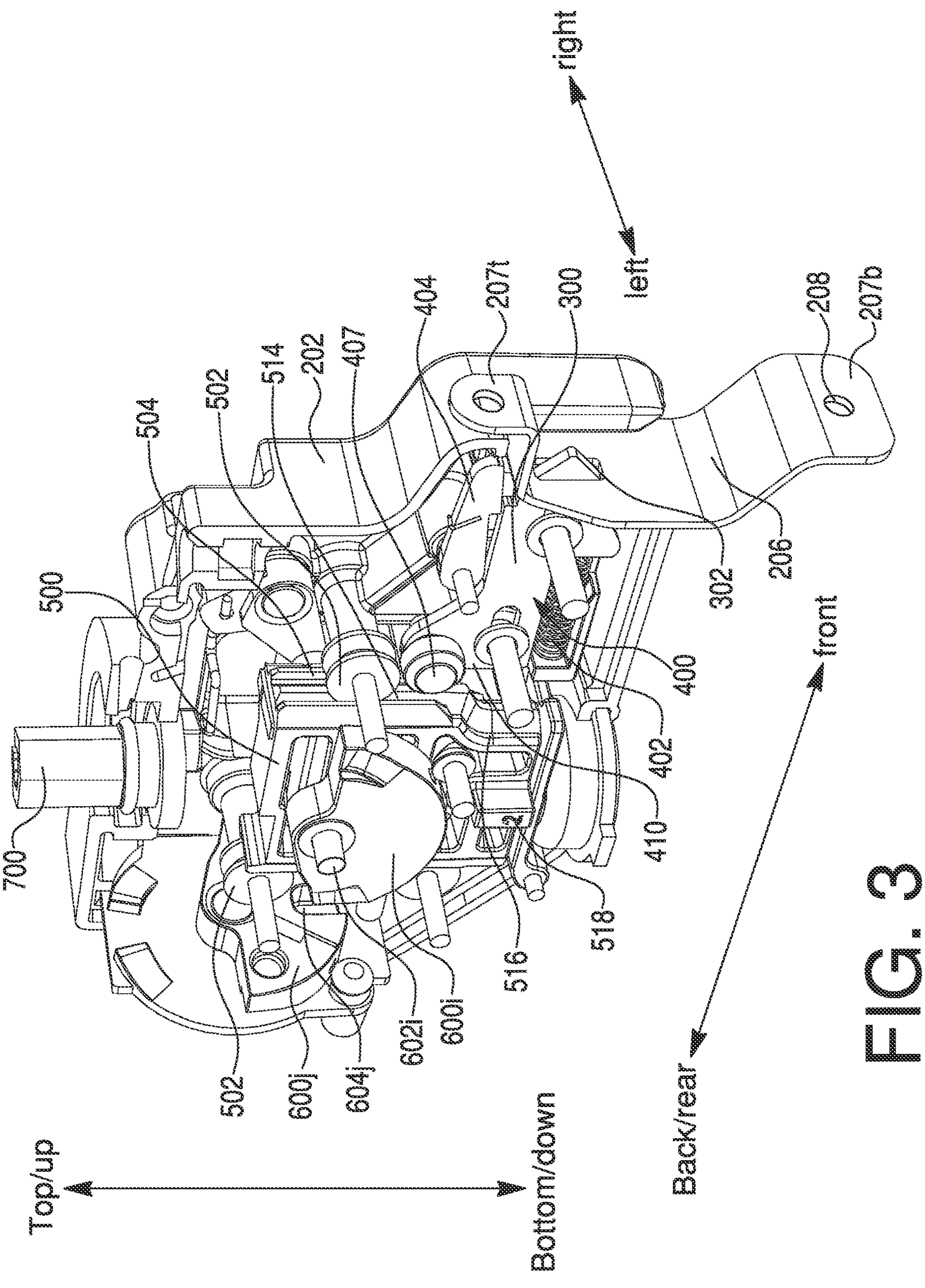
FIG. 3 shows a perspective view of FIG. 2 with the bottom cover partially removed.
Figure 5:
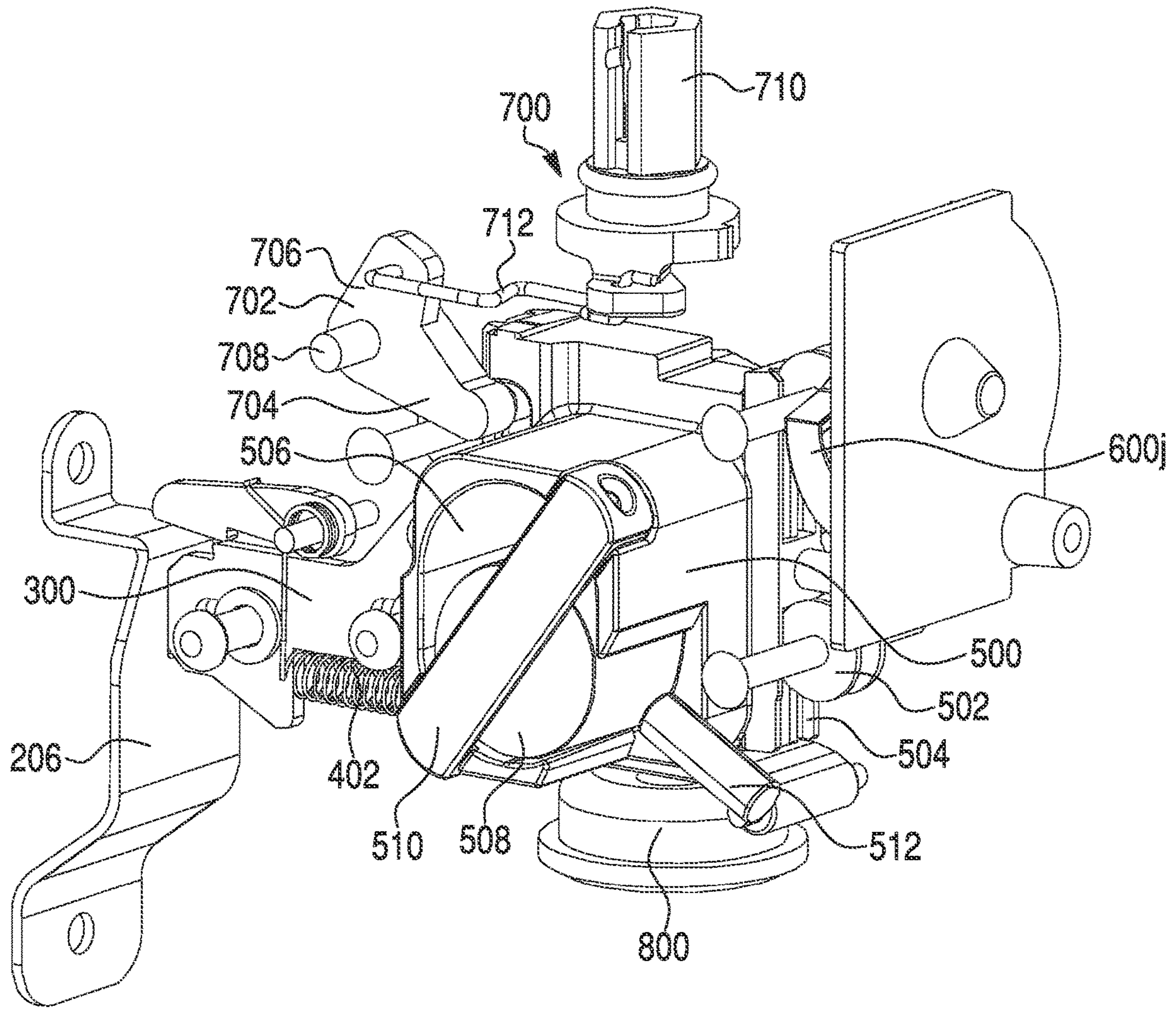
FIG. 5 shows a third perspective view of the locking device (without the bottom cover)

The sliding block 500, as shown in FIG. 4, is configured to slide in the vertical direction (top-bottom) within the bottom cover 202. To reduce friction, the sliding block 500 preferably slides on one or more rollers 502 mated to tracks 504, as best shown in FIG. 3, positioned on the front side and rear side of the block 500. The tracks 504 and rollers 502 reduce friction and allow the sliding block 500 to slide easily only in the vertical direction. When the sliding block 500 is in its top position, it is referred to herein as its lifted or opened position; and when the block 500 is in its bottom position, it is referred to herein as its lowered or locked position. The sliding block 500 preferably contains a hollow 506 containing a weight 508 retained therein (see FIG. 4). The weight 508 is preferably about 1 to about 8 times heavier than the sliding block 200. Preferably, the weight 508 is a ball. The hollow 506 is sufficiently larger than the weight 508 so that the weight 508 can freely move within the hollow 506. The weight 508 may be retained within the hollow 506, for example, by a blocking bar 510, so that the weight 508 remains within the hollow 506 and freely rolls therein. The weight 508 is detachably retained at the bottom of the of the hollow 506 by magnetic attraction. A magnet 512 is affixed, such as by adhesive or mechanical fasteners, at the bottom of the hollow 506, as best illustrated in FIGS. 4 and 5, and a ferromagnetic material is used for the weight 508 in order to achieve magnetic attraction between magnet 512 and weight 508. Alternatively, the magnet may be placed on the weight 508 and a ferromagnetic material placed at the bottom of the hollow 506. A person skilled in the art would understand that various ways are available to magnetically attach the weight 508 to the bottom of the hollow 506. The weight 508 may be disconnected from the bottom end of the hollow 506, e.g., by a force greater than the magnetic force holding the weight 508 to the magnet 512, such as may occur when the locking device is inverted and gravity pulls weight 508 toward the top of the hollow 506. The magnetic attraction between the weight 508 and the magnet 512 is sufficiently strong to maintain the weight 508 in at the bottom of the hollow 506 until the locking device is tilted at an angle to the horizontal of at least about 45°.

Figure 11:
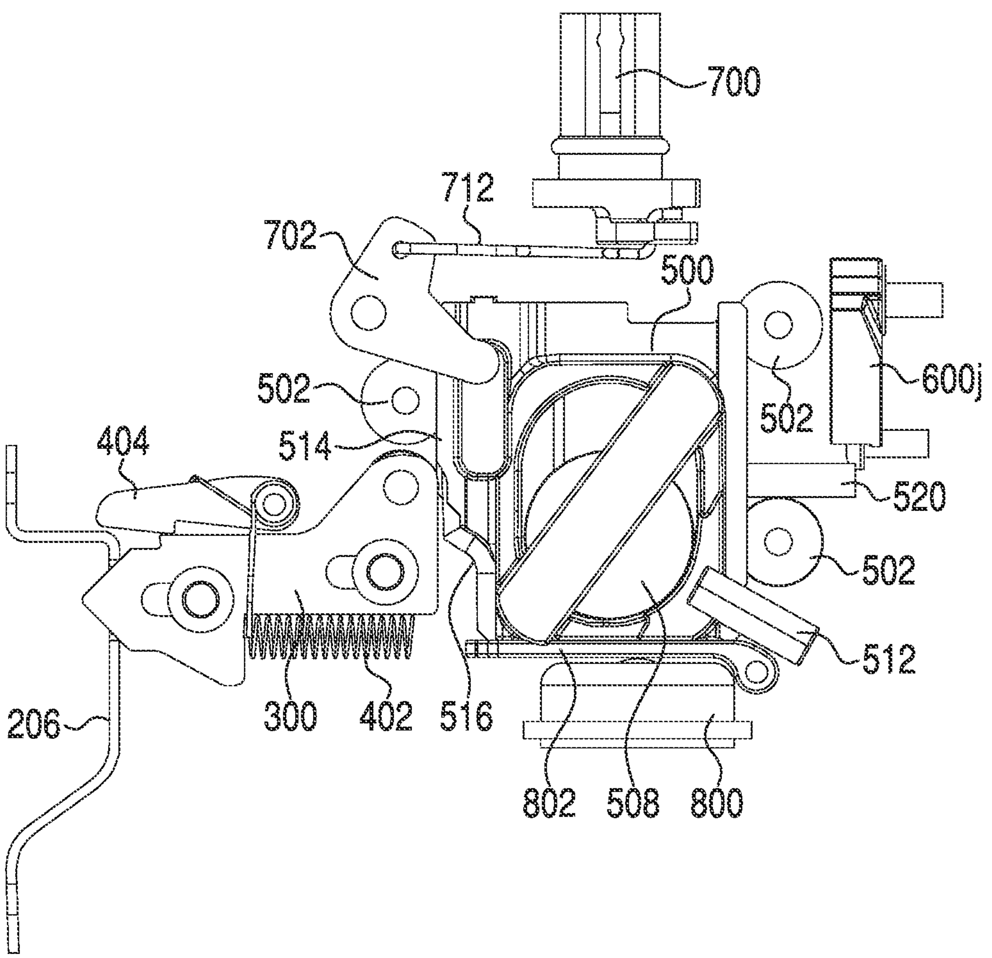
FIG. 11 shows a right side view of the locking device (without the bottom cover) with the sliding block in its lowered position.
Figure 12:
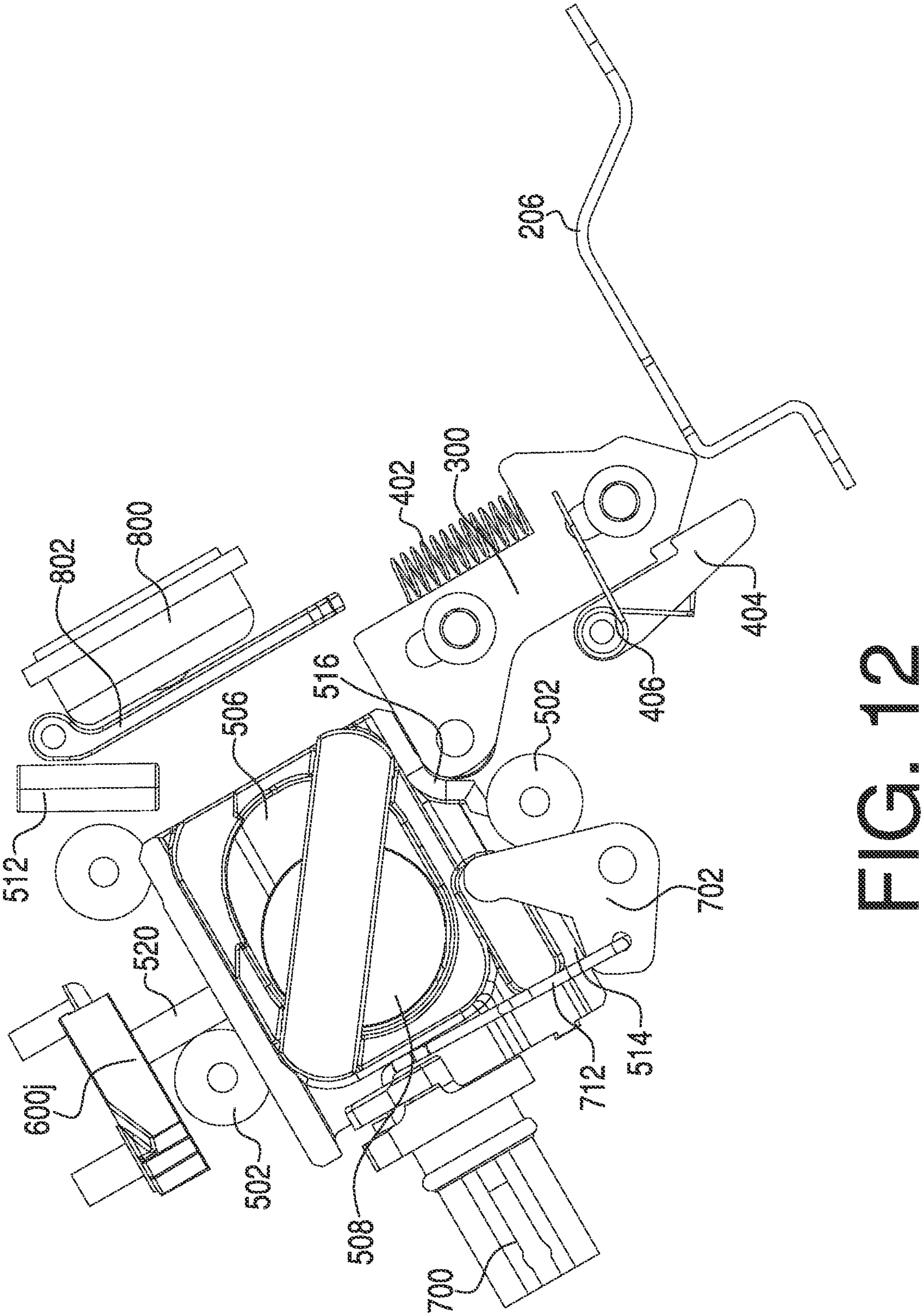
FIG. 12 shows a right side view of the locking device (without the bottom cover) when the locking device is inverted.

The front side of the sliding block 500 abuts the rear 410 of the latch 300, preferably via latch rollers 407. The front side of the sliding block 500 contains a generally vertical track 504 portion on the vertical portion 514 (see FIG. 3); however, near the lower end of the sliding block 500, the front side of the sliding block 500 slopes backwardly (see, e.g., FIGS. 3 and 10-12) forming a sloped portion 516. When the latch 300 abuts against the vertical portion 514 of the sliding block 500, the latch 300 is pushed forwardly by the sliding block 500 to extend into the locking hole 302 (see, e.g., FIG. 11). When the latch 300 abuts against the sloped portion 516 of the sliding block 500, the latch 300 retracts away from the locking hole 302 on account of the biasing force of the spring 402. Thus, when the sliding block 500 slides upwardly to its opened position, the latch 300 retracts away from the locking hole 302; and when the sliding block 500 slides downwardly to its locked position, the latch 300 is pushed forwardly to extend into the locking hole 302, provided that the locking hole 302 and the latch 300 are in alignment.

Figure 9:
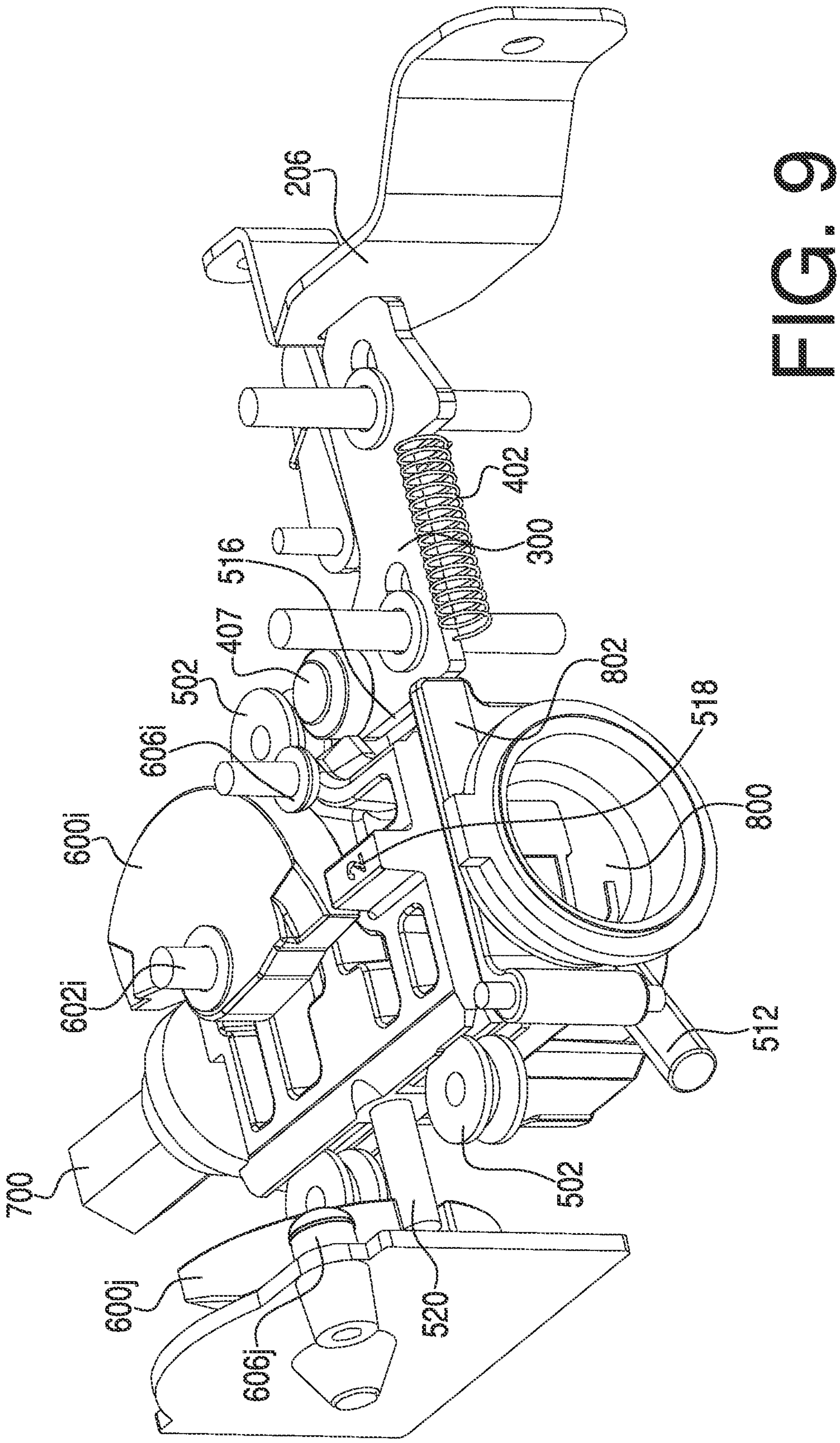
FIG. 9 is similar to FIG. 7 and illustrates one of the pendulum weights deflected from its upright position.
Figure 10:
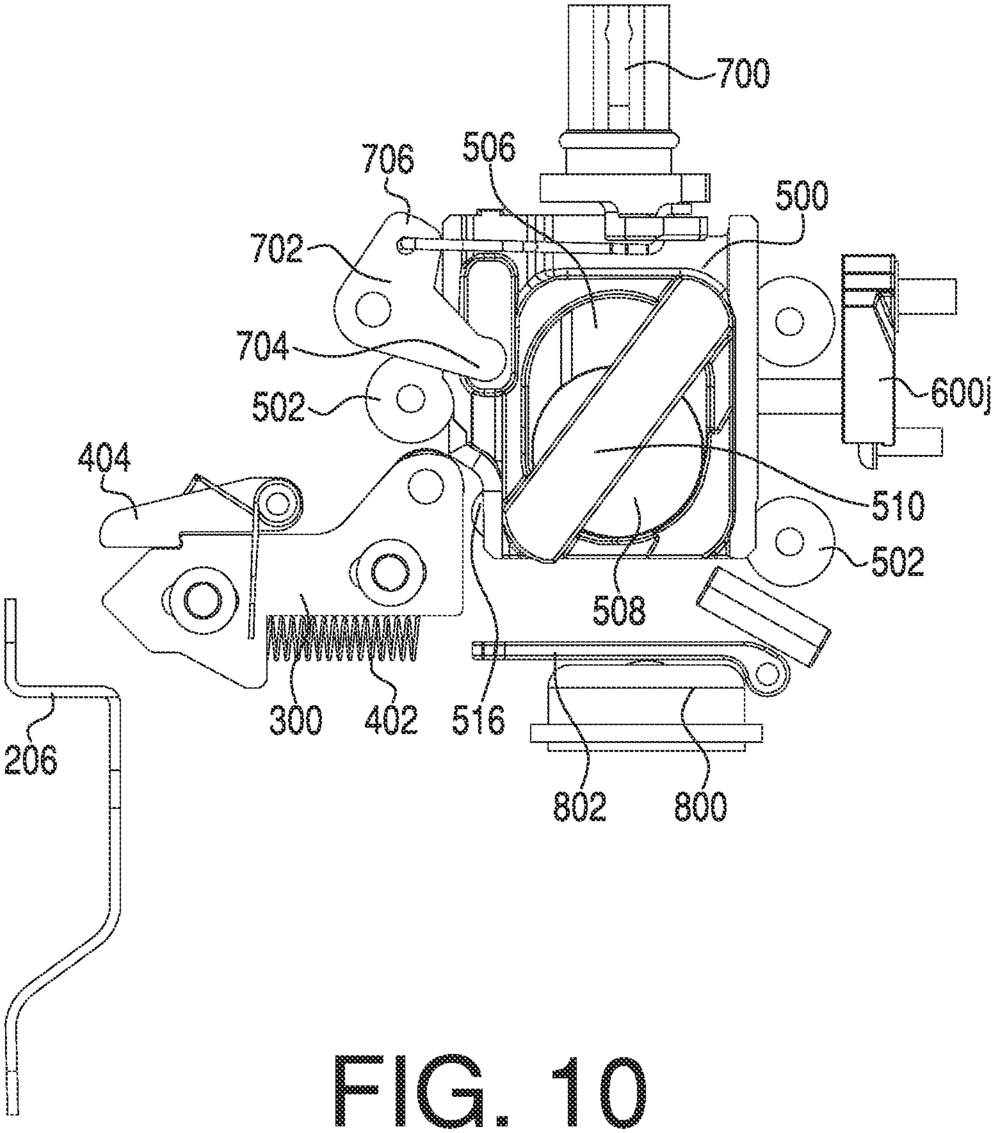
FIG. 10 shows a right side view of the locking device (without the bottom cover) with the sliding block in its lifted position to allow the lid to slightly open as shown in FIG. 1.

The locking device 100 also includes one or more pendulum weights 600 serving as a mechanical sensor that detects whether the locking device 100, and thus the container 2, has been unintendedly tipped over or whether it is being tipped over, such as for dumping. On unintended tipping, the pendulum weight 600 (as shown, e.g., in FIG. 9) blocks the sliding block 500 from moving upwardly (to its opened position), which prevents the latch 300 from retracting away the locking hole 302. The drawings show the presence of two pendulum weights 600*i* and 600*j*, although one pendulum weight may be used in the locking device 100. The first pendulum weight 600*i* serves as a sensor to detect unintended tipping in the front/back direction, while the second pendulum weight 600*j* serves a sensor to detect unintended tipping in the left/right direction.

Figure 7:
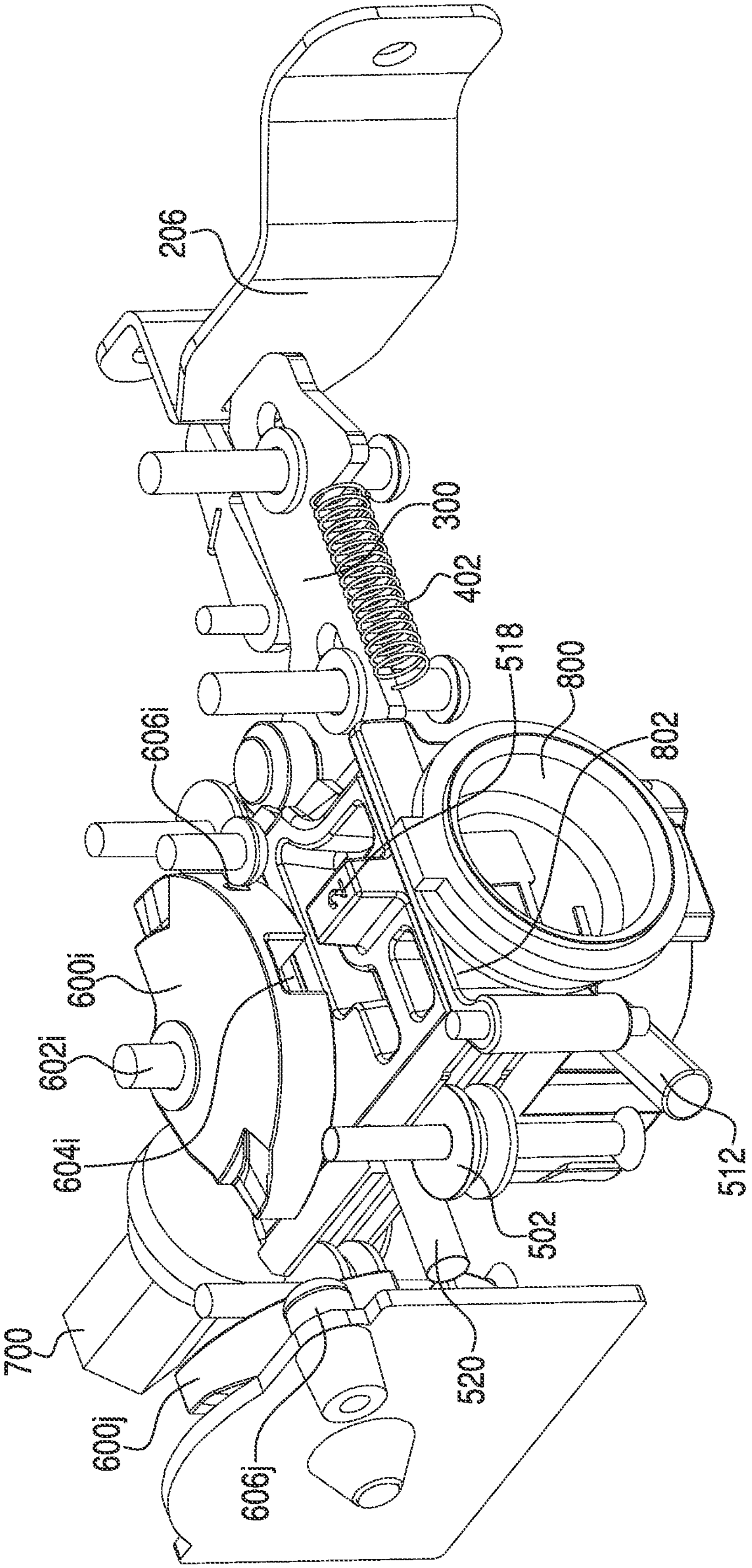
FIG. 7 shows a fifth perspective view of the locking device (without the bottom cover)

The first pendulum weight 600*i* is a flat, semicircular mass, preferably a flat semicircular plate, pivotable on a pivot post 602*i* attached to the bottom cover 202. The mass is rotatable around the post 602*i* in the front/back direction, and contains a notch 604*i* (see FIG. 7) therein which aligns with a first protrusion 518 on the sliding block 500, when the locking device 100 is in its upright position. The position where the first pendulum weight 600*i* is aligned with the protrusion 518 is referred to herein as the upright position of the pendulum weight. The first pendulum weight 600*i* is also detachably retained in its upright position by magnetic attraction. A magnet 606*i* may be affixed, by adhesive or mechanical fasteners, at the bottom cover 202 (see FIG. 7), and the first pendulum weight 600*i* includes a ferromagnetic material, such as iron, nickel, or cobalt. Alternatively, the magnet may be placed on the first pendulum 600*i* and a ferromagnetic material placed on the bottom cover 202 to accomplish the same purpose. Preferably, the first pendulum weight 600*i* is made of a polymeric material, such as acrylonitrile butadiene styrene (ABS), polycarbonate, polyethylene terephthalate (PET), polybutylene terephthalate (PBT), polyetheretherketone (PEEK), nylon, and the like; and a ferromagnetic material or a magnet is positioned thereon to magnetically retain the first pendulum weight in its upright position. A person skilled in the art would understand that various ways are available to magnetically retain the first pendulum weight 600*i* in its upright position. The first pendulum weight 600*i* may be disconnected from the magnet 606*i*, e.g., by a force greater than the magnetic force holding first pendulum weight 600*i* in its upright position, such as may occur by a jerking or jarring action (e.g., by impact with the ground) of the locking device 100. The magnetic attraction between the first pendulum weight 600*i* and the magnet 606*i* is sufficiently strong to maintain the first pendulum weight 600*i* in its upright position when the locking device is tipped over, such as for dumping, without a jerking or jarring action, but is sufficiently weak to allow the pendulum weight 600*i* to swing away from its upright position (see, e.g., FIG. 9) when the locking device 100 is subjected to a jerking or jarring motion, such as impact with the ground. Because the first pendulum weight 600*i* swings in the front/back direction, it serves as a mechanical sensor when the locking device 100 is unintentionally tipped in the forward or backward direction.

Figure 8:
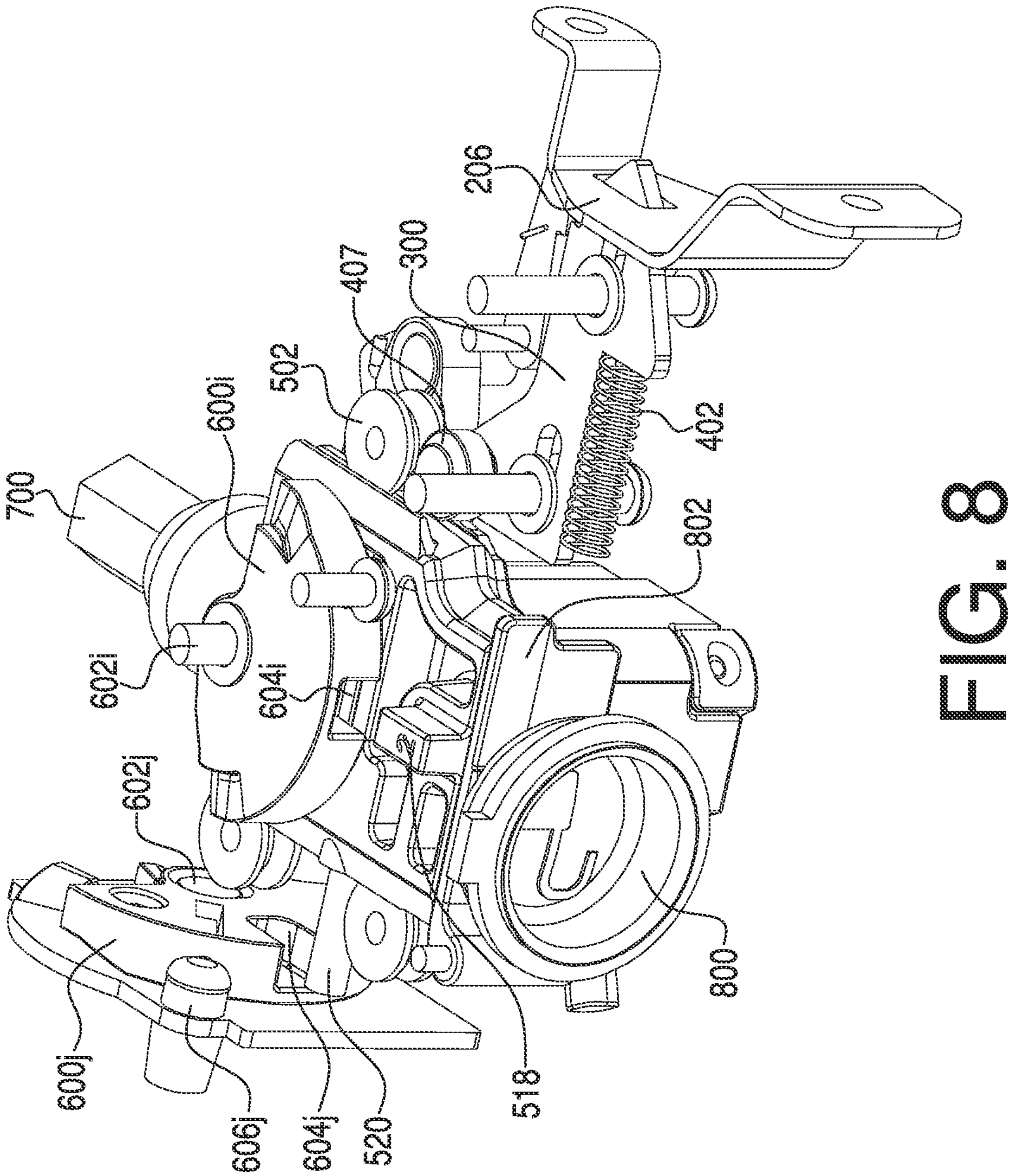
FIG. 8 shows a fifth perspective view of the locking device (without the bottom cover)

The second pendulum weight 600*j* functions the same as the first pendulum weight 600*i*, except that it swings in a left/right direction, and serves as a mechanical sensor when the locking device 100 is unintentionally tipped in the left or right direction. As such, similar parts for the second pendulum weight 600*j* are labeled with the same reference numeral with the letter "j" following the number. The second pendulum weight 600*j* is also a flat, semicircular mass, preferably a flat semicircular plate, pivotable about pivot post 602*j* attached to the bottom cover 202. The mass is rotatable around the post 602*j* in the left/right direction, and contains a notch 604*j* (see FIG. 8) therein which aligns with a second protrusion 520 on the sliding block 500, when the locking device 100 is in its upright position. The second protrusion 520 protrudes backwardly from the back side of the sliding block 500, while the first protrusion 518 protrudes from the sliding block 500 in a direction perpendicular to the direction of the second protrusion 520. The position where the second pendulum weight 600*j* is aligned with the second protrusion 520 is referred to herein as the upright position of the pendulum weight. The second pendulum weight 600*j* is also detachably retained in its upright position by magnetic attraction. A magnet 606*j* may be used and functions similarly to the magnet 606*i* described above. The second pendulum weight 600*j* may be disconnected from the magnet 606*j*, e.g., by a force greater than the magnetic force holding second pendulum weight 600*j* in its upright position, such as may occur by a jerking or jarring action (e.g., by impact with the ground) of the locking device 100. The magnetic attraction between the second pendulum weight 600*j* and the magnet 606*j* is sufficiently strong to maintain the second pendulum weight 600*j* in its upright position when the locking device is tipped over, such as for dumping, without a jerking or jarring action, but is sufficiently weak to allow the second pendulum weight 600*j* to swing away from its upright position when the locking device 100 is subjected to a jerking or jarring motion, such as impact with the ground.

Figure 13:
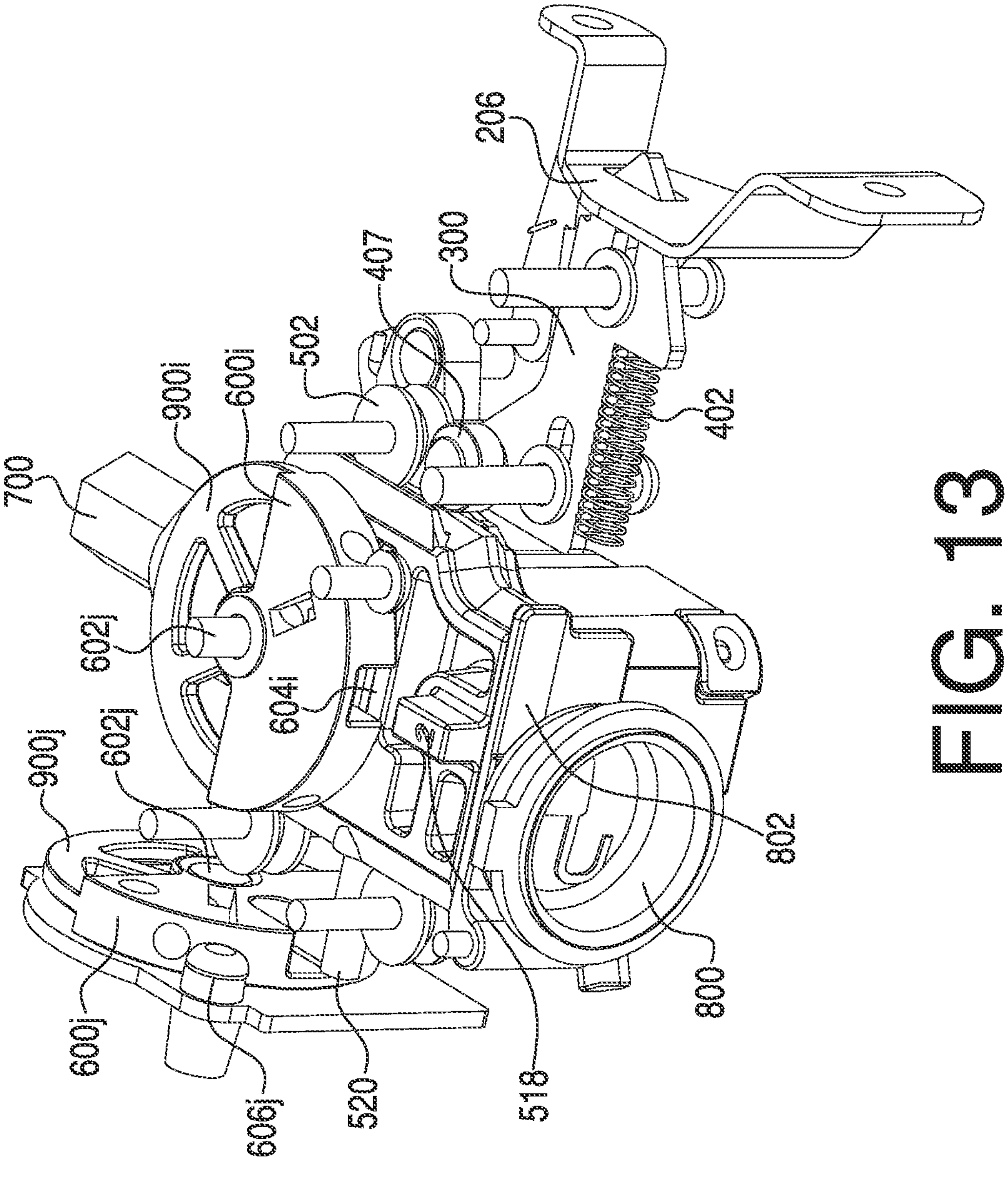
FIG. 13 shows a perspective view of the locking device where the pendulum weights have associated cage extensions.

In certain embodiments one or more of the first or second pendulum weight 600*i* or 600*j* may include a cage extension 900*i* or 900*j*, as shown in FIG. 13. Henceforth, the first cage extension 900*i*, associated with the first pendulum weight 600*i*, will be described with the understanding that the second cage extension 900*j*, associated with the second pendulum weight 600*j*, is identical. The first cage extension 900*i* is contiguous with and extends from the first pendulum weight 600*i* to form a complete circle. The first cage extension 900*i* may be from integral with the first pendulum weight 600*i* using the same material. Alternatively, the first cage extension 900*i* may be formed separate from the first pendulum weight 600*i*, using a different or the same material, and attached thereto, e.g., by welding, adhesive or mechanical attachment. In any event, the weight of the first cage extension 900*i*, however, is negligible when compared to the weight of the first pendulum weight 600*i*, so that the first cage extension 900*i* does not affect the pendulum action of the first pendulum weight 600*i*, i.e., the center gravity of the pendulum weight 600*i* and the cage extension 900*i* remains below the pivot post 602*i*. Without the first cage extension 900*i*, the swing arc of the first pendulum weight 600*i* must be limited to less than the arc occupied by the pendulum weight 600*i* for proper function, because when the pendulum weight 600*i* swings beyond its arc, the pendulum weight no longer blocks the sliding block 500. With the first cage extension 900*i*, however, the swing arc of the first pendulum weight 600*i* may be up to 360°.

The locking device 100 may further include a manual opening mechanism 700 for manually opening the container (see, e.g., FIG. 5). The manual opening mechanism 700 allows a user to manually lift the sliding block 500 upwardly to the opened position. A particular mechanism is illustrated in the Figures; however, other mechanisms are also appropriate for the present invention. As best illustrated in FIG. 5, the manual opening mechanism 700 contains a bent lever 702 having at first arm 704 and a second arm 706. The lever 702 is mounted on a post 708, which serves as a fulcrum for the lever 702. The end of the first arm 704 is connected to the sliding block 500; and the end of the second arm 706 is connected to a turning knob 710 via a rod 712. The opening mechanism 700 is configured such that turning the turning knob 710 pivots the lever 702 so that the first arm 704 of the lever 702 lifts the sliding block 500 upwardly to its opened position.

Figure 6:
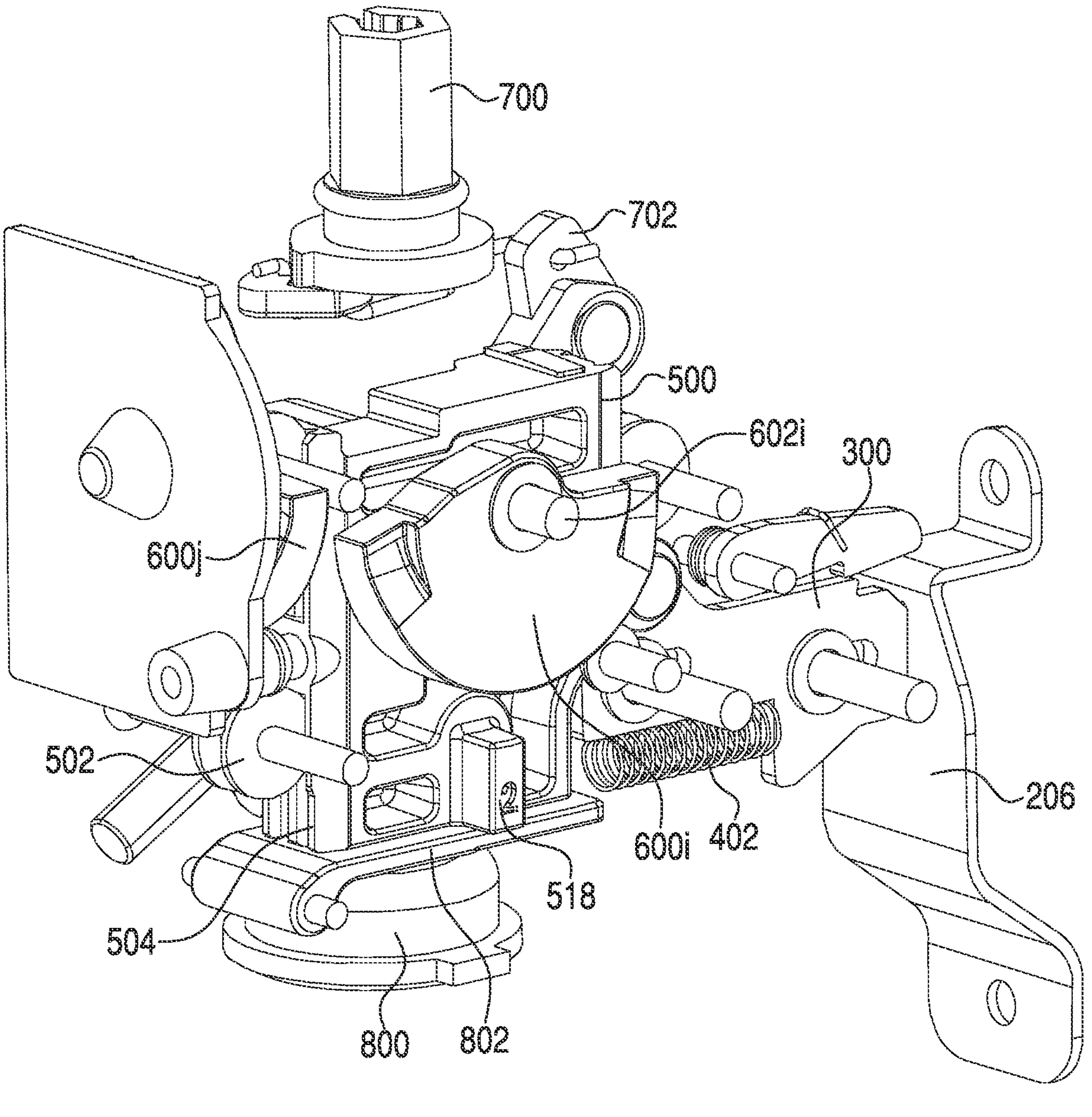
FIG. 6 shows a fourth perspective view of the locking device (without the bottom cover)

The locking block may further include a safety release 800, as best shown in FIG. 6. The safety release 800 is configured to provide a mechanism to lift the sliding block 500 upwardly to release the latch 300 from the locking hole 302 from within the container 2, e.g., to be used in the event a person is trapped inside the waste container 2. The safety release 800 protrudes from the bottom cover 202 and provides a deformable button for a person to push. When the safety release 800 is pushed, it engages and raises a lever 802, immediately above the safety release, which, in turn, lifts the sliding block 500 upwardly (to its opened position) to disconnect the latch 300 from the locking hole 302. That unlatching allows the trapped person to lift the lid 4 to free himself/herself.

In manual use, to open the waste container 2, the user turns the turning knob 710 to lift the sliding block 500 upwardly. As the sliding block 500 slides upwardly to its opened position, the protrusions 518 and 520 enter their respective notches 604*i* and 604, respectively, and the roller 407 rolls from the vertical portion 514 of the sliding block 500 to the sloped portion 516. When at the sloped portion 516, the spring 402 causes the latch 300 to slide backwardly away from the locking hole 302 to a retracted position, thus unlocking the lid 4 and allowing the user to lift the lid 4 to open the waste container 2.

When the user closes the lid 4, gravity pulls the sliding block 504 downwardly, which causes the roller 407 to slide from the sloped portion 516 to the vertical portion of the sliding block 500. That action pushes the latch 300 forwardly toward the locking hole 302 to position the latch 300 within the locking hole 302, thereby locking the lid 4 closed. In certain embodiments, it is desirable to delay the sliding block 504 from sliding downwardly until after the user lowers the lid 4 completely onto the main box 6. Otherwise, premature pushing of the latch 300 in the forward direction may hinder proper locking of the lid 4. To effect the delay, when the lid 4 is opened, the deflecting arm 404 engages and holds and maintains the latch 300 in the retracted position (see FIG. 10). When the deflecting arm 404 hits the locking member 206, as the lid 4 is being closed, the deflecting arm 404 is deflected away from and disengages the latch 300 to allow the latch 300 to be pushed forwardly toward the locking hole 302 to lock the closed lid 4 (see FIG. 11).

In the event that the waste container 2 is knocked over, e.g., by strong wind or animals, the jerking or jarring action, such as by ground impact, with the waste container 2 deflects at least one of the pendulum weights 600*i*, 600*j* from its magnetic attachment. When the container 2 is knocked over in the front/back direction, the first pendulum weight 600*i* is deflected; and when the container is knocked over in the left/right direction, the second pendulum weight 600*j* is deflected. Such actions, when the waste container 2 is knocked over onto its side, causes one of the pendulum weights 600 to be deflected, due to gravity, from its upright position, thereby preventing the sliding block 500 from sliding upwardly to allow the lid 4 to open, because at least one of the protrusions 518 and 520 is misaligned with its respective notch 604*i* or 604*j*. Accordingly, due to the angular deflection of at least one of the pendulum weights from its upright position, the lid 4 cannot be opened when the waste container 2 is on its side. The interaction of the sliding block 500 and the pendulum weights 600*i*, 600*j* thus provides a mechanical sensor that detects whether the container 2 has been unintentionally tipped over, such as by wind or animals, or whether it being intentionally tipped over, such as for dumping.

On the other hand, when the waste container 2 is laid on its side, e.g., by a user or an automated lifting device on a waste removal vehicle, the pendulum weights 600*i*, 600*j* remain magnetically attached in their upright position. That way, the notches 604*i* and 604*j* are in alignment with their respective protrusions 518 and 520. The lid 4 can thus be opened by turning the turning knob 710 as describe above.

The waste container 2 may be opened automatically by gravity when it is inverted, such as during tipping. When the container 2 is intentionally inverted past the horizontal, gravity pulls the sliding block 500 upwardly (see FIG. 12). In some cases, the weight 508 falling from the bottom of the hollow 506 to the top of the hollow 506 (compare FIGS. 11 and 12) provides impetus for the sliding block 500 to slide upwardly. As the sliding block 500 slides upwardly, the protrusions 518 and 520 enter their respective notches 604*i* and 604, respectively, and the roller 407 rolls from the vertical portion 514 of the sliding block 500 to the sloped portion 516. When at the sloped portion 516, the spring 402 causes the latch 300 to slide backwardly away from the locking hole 302 to a retracted position, thus, unlocking the lid 4 and allowing the lid 4 to fall away from the container body 6 (by gravity) to open the waste container 2 and allow the waste therein to be dumped.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A locking device, comprising:

a. a sliding block slidable between a locked position and an open position, and comprises a hollow containing a first weight rollable within the hollow; and b. a second weight detachably attached to a magnet, when detached from the magnet, the second weight pivots to a blocking position blocking the sliding block from sliding to an open position.

2. The locking device of claim 1, further comprising a latching mechanism abutting and operably associated with the sliding block.

3. The locking device of claim 1, wherein, when the locking device is subjected to a jerking or jarring motion, the weight detaches from the magnet.

4. The locking device of claim 1, wherein the first weight is retained at the bottom of the hollow by a second magnet.

5. The locking device of claim 1, wherein the magnetic force holding the first weight is less than the gravitational force on the first weight.

6. The locking device of claim 1, further comprising a safety release for placing the sliding block into the open position.

7. The locking device of claim 1, further comprising a cover enclosing the sliding block and the weight.

8. The locking device of claim 1, further comprising a safety release extending from the bottom cover for placing the sliding block into the open position.

9. A waste container comprising a main box, a lid attached to the main box by a lid hinge, the lid comprising the locking device of claim 1 mounted thereon.

10. The waste container of claim 9, wherein the locking device keeps the lid locked when the waste container falls over and impacts the ground.

11. The waste container of claim 9, further comprising a locking member mounted to a wall of the main box.

12. The waste container of claim 9, further comprising a locking member mounted to a wall of the main box, the locking member engageable with the latching mechanism to lock the lid.

13. The waste container of claim 9, further comprising a latching mechanism abutting and operably associated with the sliding block.

14. The waste container of claim 9, wherein, when the locking device is subjected to a jerking or jarring motion, the weight detaches from the magnet.

15. The waste container of claim 9, wherein the first weight is retained at the bottom of the hollow by a second magnet.

16. The waste container of claim 15, wherein the magnetic force holding the first weight is less than the gravitational force on the first weight.

17. A method for making a waste container, comprising the steps of a. providing a main box for containing waste and a lid attached to the main box by a lid hinge; and b. mounting the locking device of claim 1 in a cutout of the lid.

18. The method of claim 17, further comprising the step of fastening a locking member to a wall of the main box.

19. The method of claim 17, wherein the first weight is retained at the bottom of the hollow by a second magnet.

20. The method of claim 19, wherein the magnetic force holding the first weight is less than the gravitational force on the first weight.

* * * * *